(12) United States Patent
Gould et al.

(10) Patent No.: US 7,301,792 B2
(45) Date of Patent: Nov. 27, 2007

(54) APPARATUS AND METHOD OF ORDERING STATE TRANSITION RULES FOR MEMORY EFFICIENT, PROGRAMMABLE, PATTERN MATCHING FINITE STATE MACHINE HARDWARE

(75) Inventors: Stephen Gould, Killara (AU); Robert Matthew Barrie, Double Bay (AU); Darren Williams, Newtown (AU); Nicholas de Jong, Bondi Junction (AU)

(73) Assignee: Sensory Networks, Inc., Palo Alto, CA (US)

( * ) Notice: Subject to any disclaimer, the term of this patent is extended or adjusted under 35 U.S.C. 154(b) by 0 days.

(21) Appl. No.: 11/422,529

(22) Filed: Jun. 6, 2006

(65) Prior Publication Data

US 2006/0221658 A1     Oct. 5, 2006

Related U.S. Application Data

(63) Continuation of application No. 10/799,367, filed on Mar. 12, 2004, now Pat. No. 7,082,044.

(60) Provisional application No. 60/454,398, filed on Mar. 12, 2003.

(51) Int. Cl.
   *G11C 15/00*    (2006.01)
(52) U.S. Cl. .................. 365/49; 711/108; 711/203; 370/392
(58) Field of Classification Search ............ 365/49; 711/108, 203; 370/392; 716/2, 5, 4
   See application file for complete search history.

(56) References Cited

U.S. PATENT DOCUMENTS 5,125,098 A    6/1992  Burrows
5,471,206 A    11/1995 Allen et al.
5,475,388 A    12/1995 Gormish et al.
5,610,812 A    3/1997  Schabes et al.
5,617,573 A    4/1997  Huang et al.
5,873,097 A    2/1999  Harris et al.
5,926,396 A *  7/1999  Ohara ........................... 716/4
6,131,151 A *  10/2000 Graef .......................... 711/173
6,418,042 B1*  7/2002  Srinivasan et al. ............ 365/49
6,442,672 B1*  8/2002  Ganapathy ................... 712/201
6,609,189 B1*  8/2003  Kuszmaul et al. ............. 712/23
6,742,107 B2*  5/2004  Jinzaki ........................ 712/200
6,836,877 B1*  12/2004 Dupenloup .................. 716/18

(Continued)

FOREIGN PATENT DOCUMENTS

WO    WO 2004/081761 A2    9/2004

*Primary Examiner*—Viet Q. Nguyen
(74) *Attorney, Agent, or Firm*—Townsend and Townsend and Crew LLP (57) ABSTRACT

A programmable finite state machine (FSM) includes, in part, first and second memories, and a selection circuit coupled to each of the memories. Upon receiving a (k+m)-bit word representative of the k-bit input symbol and the m-bit current state, the first memory supplies one ore more matching transition rules stored therein. The selection circuit selects the most specific of the supplied rules. The transition rules are stored in the first memory in a ranking order of generality. The second memory receives the selected transition rule and supplies the next state of the FSM. The first memory may be a ternary content addressable memory and the second memory may be a static random access memory. The contents of both the content addressable memory and the static random memory is determined by an algorithm which minimizes the number of terms required to represent the next-state transition functions.

29 Claims, 10 Drawing Sheets

U.S. PATENT DOCUMENTS

| | | | |
|---|---|---|---|
| 7,073,143 B1 * | 7/2006 | Huang | 716/5 |
| 7,082,044 B2 * | 7/2006 | Gould et al. | 365/49 |
| 7,219,319 B2 * | 5/2007 | Gould et al. | 716/5 |
| 2004/0054848 A1 | 3/2004 | Folsom | |
| 2004/0148415 A1 | 7/2004 | Sikdar | |
| 2005/0114700 A1 | 5/2005 | Barrie et al. | |

* cited by examiner

APPARATUS AND METHOD OF ORDERING STATE TRANSITION RULES FOR MEMORY EFFICIENT, PROGRAMMABLE, PATTERN MATCHING FINITE STATE MACHINE HARDWARE

CROSS-REFERENCES TO RELATED APPLICATIONS

The present application claims benefit under 35 USC 119(e) of U.S. provisional application No. 60/454,398, filed on Mar. 12, 2003, entitled "Apparatus And Method For Memory Efficient, Programmable, Pattern Matching Finite State Machine Hardware", the content of which is incorporated herein by reference in its entirety.

The present application is a continuation of and claims priority under 35 U.S.C. 120 from application Ser. No. 10/799,367 filed Mar. 12, 2004, entitled "Apparatus and Method For Memory Efficient, Programmable, Pattern Matching Finite State Machine Hardware," now U.S. Pat. No. 7,082,044 the content of which is incorporated herein by reference in its entirety.

FIELD OF THE INVENTION

The present invention relates to integrated circuits, and more particularly to memory efficient programmable finite state machines.

BACKGROUND OF THE INVENTION

Deep content inspection of network packets is driven, in large part, by the need for high performance quality-of-service (QoS) and signature-based security systems. Typically QoS systems are configured to implement intelligent management and deliver content-based services which, in turn, involve high-speed inspection of packet payloads. Likewise, signature-based security services, such as intrusion detection, virus scanning, content identification, network surveillance, spam filtering, etc., involve high-speed pattern matching on network data.

The signature databases used by these services are updated on a regular basis, such as when new viruses are found, or when operating system vulnerabilities are detected. This means that the device performing the pattern matching must be programmable.

As network speeds increase, QoS and signature-based security services are finding it increasingly more challenging to keep up with the demands of matching packet contents. The services therefore sacrifice content delivery or network security by being required to miss packets. Currently, fast programmable pattern matching machines are implemented using finite state machines (FSM). As is known, the process of mapping a regular expression, or signature database, to a FSM involves compiling the expression into a non-deterministic finite-state automaton (NFA), and then converting the NFA to a deterministic finite-state automaton (DFA).

An FSM typically starts in a given initial state, usually state zero. On receipt of each input symbol, the FSM advances to a new state determined by the current state, together with the input symbol. This operation is referred to as calculating the "next state" or "transition function" of the finite state machine. The calculation of the next state is often performed through a table lookup. The table, known as the "transition table", is arranged so as to have the row number determined by the current state and the column number by the current input symbol. Each entry in the transition table contains the value for the next state given that current state, as defined by the row, and the input symbol, as defined by the column. The transition table is commonly stored using a RAM lookup table. Data symbols received from a digital network are usually encoded as 8-bit bytes, and the number of states is determined by the complexity of the given application. The following pseudo-code illustrates the FSM operation:

```
CURRENT_STATE = 0
for each INPUT_SYMBOL,
    NEXT_STATE =TRANSITION_TABLE[CURRENT_STATE][INPUT_SYMBOL]
CURRENT_STATE = NEXT_STATE
next INPUT_SYMBOL
```

Figure 1:
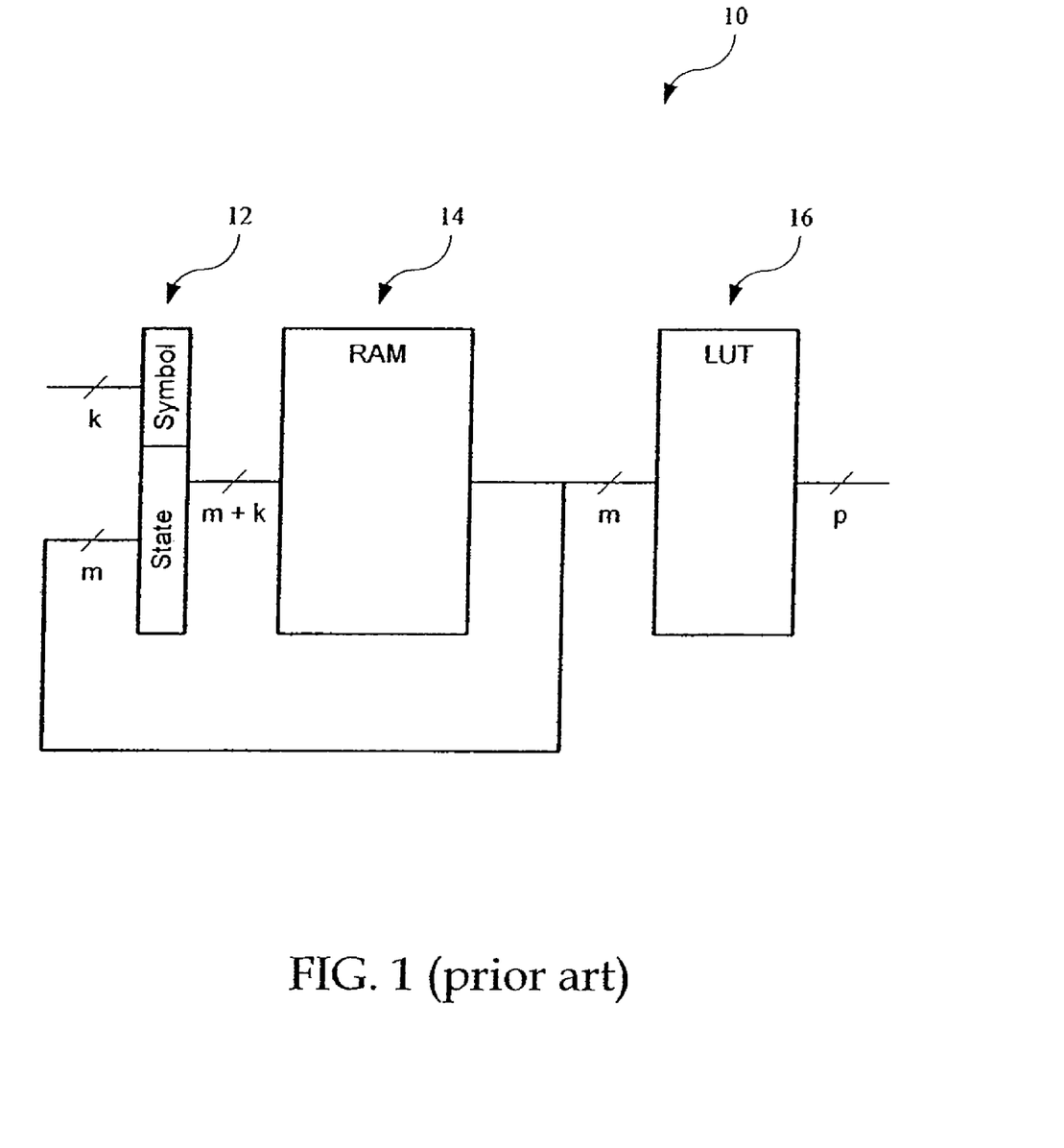
FIG. 1 is a simplified high-level block diagram of a finite state machine, as known in the prior art.

FIG. 1 shows a block diagram of a conventional finite state machine 10. The current state is encoded as an m-bit binary word, and the current input symbol as a k-bit binary word. These bits are concatenated together by logic block 12 to form an (m+k)-bit address to a RAM lookup table 14. RAM 14 contains the state transition table, that is, each RAM entry contains an m-bit word representing the next state given the current state and the input symbol. Look-up table 16 receives data from RAM look-up table 14 to define the action to take in each particular state. This is used to indicate terminal/accept states, etc. These actions are shown as being encoded as p-bit words.

Programmable FSMs are often expensive because of the size of the memory required to store the transition table. This problem is even more pronounced for fast FSMs which are required to compute the next state within a few and fixed number of clock cycles. For example, the state machine implementation shown in FIG. 1, having m-bit state vector and k-bit symbols, requires $2^{m+k}$ entries of m-bit words for storing the full transition table. Additional memory is required for the output look-up table. For example, for an application servicing 1 Gbps network traffic, the FSM is required to compute the next state every 8 ns, for 8-bit input symbols. This poses a challenging task.

U.S. Pat. No. 6,167,047 describes a technique in which memory optimization is achieved through usage of stack memory allowing the state machine to repeat common sub-expressions while calculating the next state within a single clock cycle. This technique uses a large memory, and therefore limits the complexity of the FSM. This technique also suffers from the problem that the stack memory is limited.

BRIEF SUMMARY OF THE INVENTION

A programmable finite state machine (FSM), in accordance with one embodiment of the present invention includes, in part, a pair of memories, and a selecting circuit coupled to each of the memories. Upon receiving a (k+m)-bit word representative of the k-bit input symbol and the m-bit current state, the first memory supplies one or more matching transition rules stored therein. The selecting circuit selects the most specific of the supplied rules. The transition rules are stored in the first memory in a ranking order of generality. The second memory is configured to receive the selected transition rule and to supply the next state of the FSM. In some embodiments, the first memory is a ternary content addressable memory and the second memory is a static random access memory. Furthermore, in some embodiments, the ranking order of generality is an increasing order of generality, and in other embodiments the ranking order of generality is a decreasing order of generality.

In some embodiments, the FSM further includes a register configured to receive and store the k-bit input symbol and the m-bit current state and to supply the (k+m)-bit word supplied to the first memory. The FSM may further include a look-up table configured to supply the FSM's output. The selection circuit may be a priority encoder or a priority arbiter. To increase the depth or the width of the FSM, several commercially available CAMs can be coupled to one another.

The finite state machine that is implemented in hardware has significantly reduced memory requirements. The contents of both the content addressable memory and the static random memory is determined by an algorithm, in accordance with the present invention. The algorithm is an iterative algorithm which minimizes the number of terms required to represent the next-state transition functions. The data generated by this algorithm are subsequently uploaded to the two memories.

DETAILED DESCRIPTION OF THE INVENTION

Figure 2:
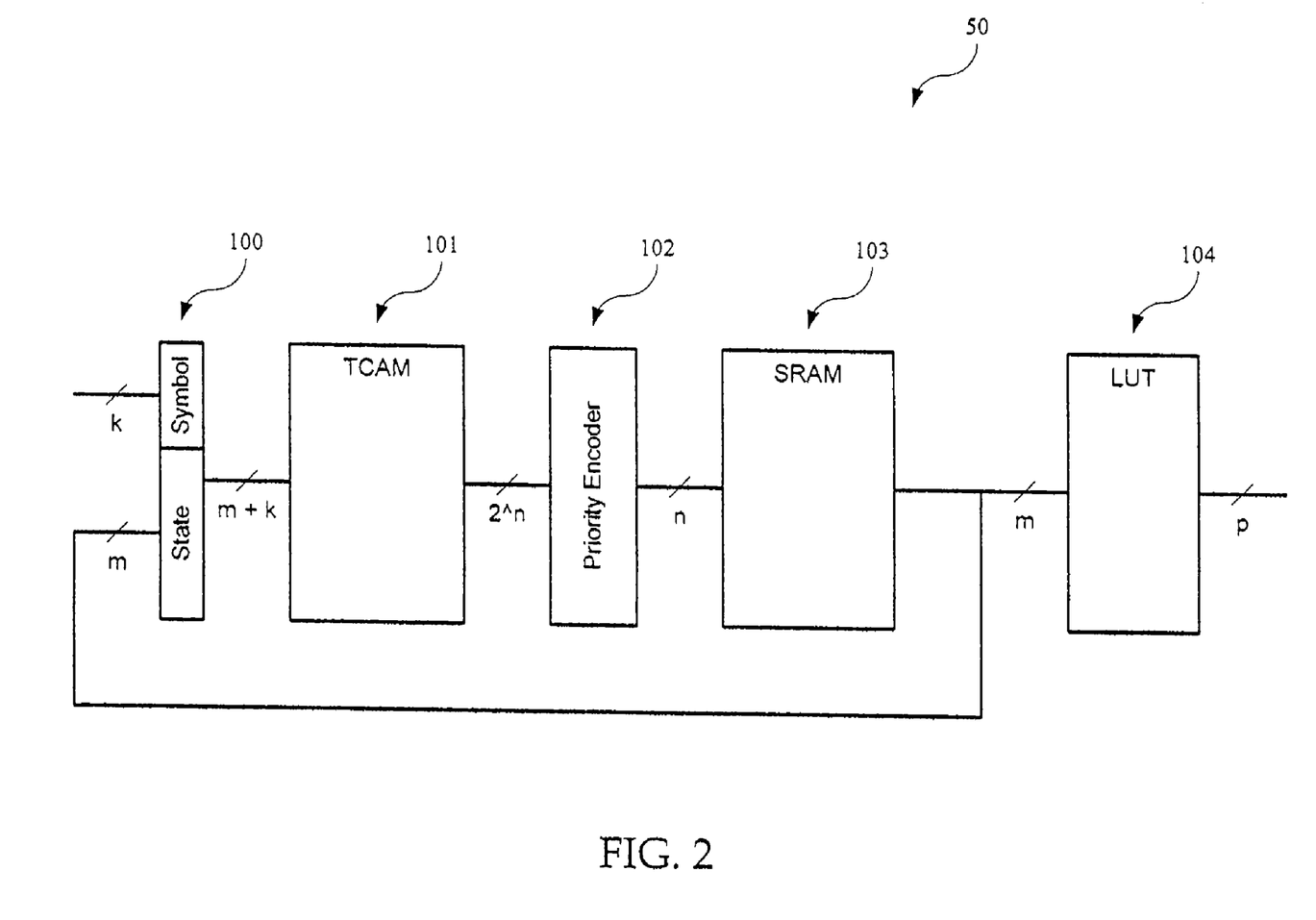
FIG. 2 is a simplified high-level block diagram of a programmable finite state machine, in accordance with one embodiment of the present invention.

In accordance with the present invention, a programmable finite state machine (FSM), is configured to require less memory storage capacity to perform fast pattern matching than those known in the prior art. FIG. 2 is a simplified high-level block diagram of an FSM 50, in accordance with one embodiment of the present invention. FSM 50 is shown as including, in part, a register 100 adapted to store the current state and input symbol, a ternary content addressable memory (TCAM) 101 adapted to store transition rules, a priority encoder 102 adapted to select the most specific rule from all rules which match, an SRAM 103 adapted to deliver the next state in response to the rule selected by TCAM 101, and a look-up table (LUT) 104 adapted to deliver FSM 50's output defining the action the FSM 50 performs. Priority encoder 102 receives $2^n$ wordlines (signals) and represents the first asserted wordline as an n-bit binary coded signal.

Figure 3:
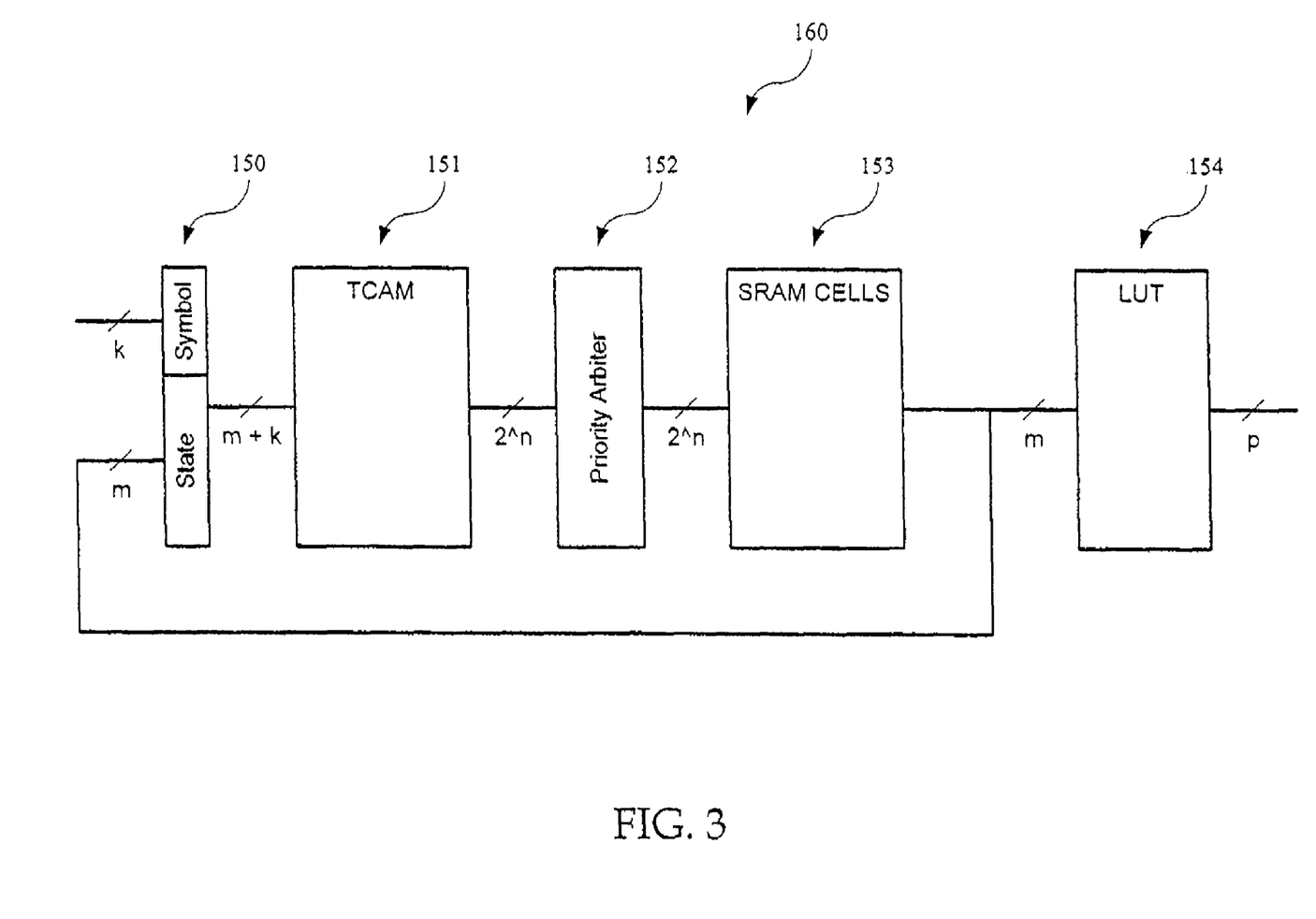
FIG. 3 is a simplified high-level block diagram of a programmable finite state machine, in accordance with another embodiment of the present invention.

FIG. 3 is a simplified high-level block diagram of an FSM 160, in accordance with another embodiment of the present invention. FSM 160 is similar to FSM 50 except that it includes a priority arbiter 152 in place of priority encoder 102. Priority arbiter 152 receives $2^2$ wordlines, zero or more of these wordlines being asserted, and generates $2^n$ wordlines with only zero or one asserted, with the asserted wordline corresponding to the first asserted input wordline. In other words, priority arbiter 152 deasserts all but zero or one the received wordlines.

In the following, k is the number of bits required to represent each symbol, and m is the number of bits required to represent each state within the FSM 50. Thus, the total number of states is $2^m$, and up to 256 symbols may be represented if k is equal to 8. TCAM 101 contains a lookup table for transitions into each state and is adapted to benefit from a sizeable amount of memory compression. TCAM 101 may have $2^n$ entries of length (m+k)-bits, where n is typically smaller than (m+k). The matching TCAM word is delivered to priority encoder 102 which selects the lowest address encoded as an n-bit word. Thus entries are stored in the TCAM ordered from most specific to most general. Unless otherwise stated, in the following, all numbers are assumed to be in the decimal format.

Figure 4A:
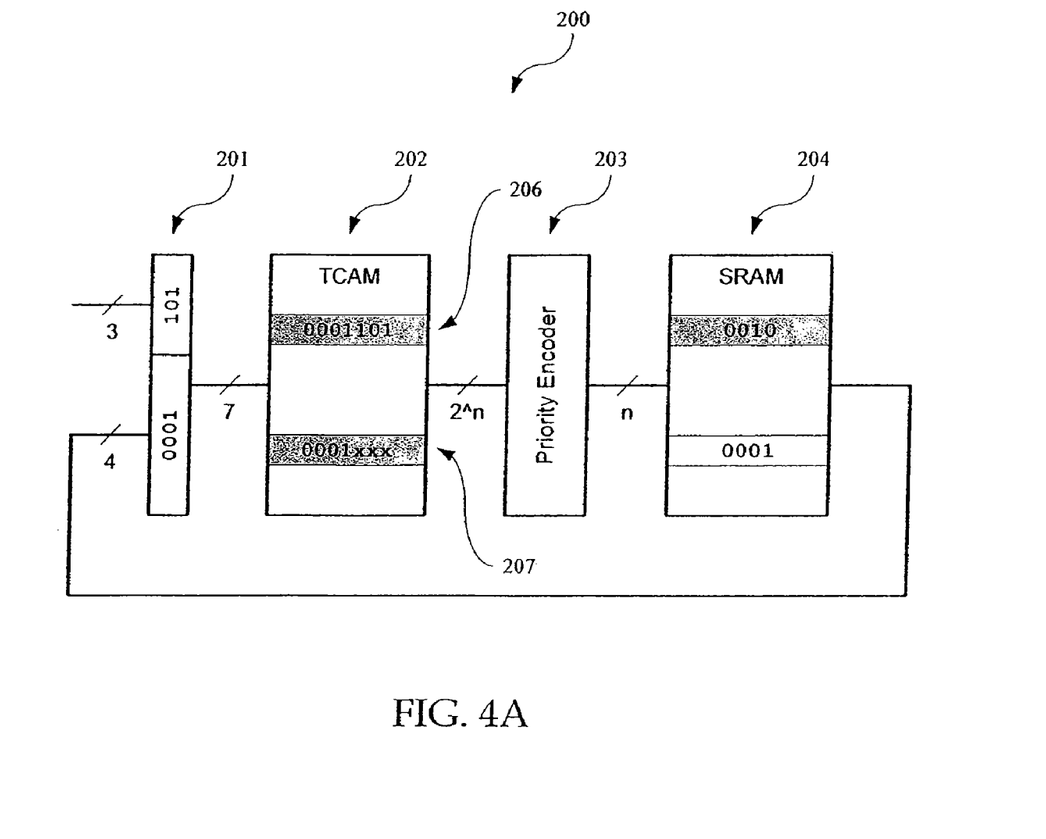
FIGS. 4A-4B show an example of the operation of the finite state machine of FIG. 2, in accordance with one embodiment of the present invention.
Figure 4B:
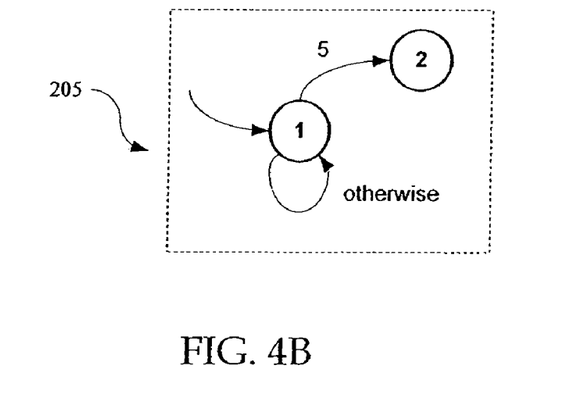

FIG. 4A shows an exemplary embodiment of an FSM 200, in accordance with one embodiment of the present invention. FIG. 4B shows a portion of the state transition diagram 205 of FSM 200. According to this transition diagram, if the FSM is in state 1 and it receives input symbol 5, the FSMs transition to state 2, otherwise the FSM remains in state 1. In this exemplary embodiment, each state is encoded using a 4-bit binary number, and each symbol is encoded using a 3-bit binary number. Two of TCAM 202 entries are also shown, namely entries 206 and 207. As shown in FIG. 4, the current state is assumed to be binary "0001", and the input symbol is assumed to be binary "101". Accordingly, register 201 delivers the 7-bit input binary "0001101" to TCAM 202.

TCAM 202 is shown as having two entries, namely 206 and 207 that match the data received by TCAM 202. Entry 206 includes binary data "0001101", and entry 207 includes binary data "0001xxx" where "x" represents a "don't care" bit. The entries are ordered so that the more specific rule, binary "0001101", matches first, and is therefore the rule selected by the priority encoder 203. SRAM 204 contains the next state, i.e., state 2 for this combination of state and input symbol, as shown in state transition diagram 205. If while in state 1, an input symbol other than 5 is received, the second rule is selected, and the FSM remains in state 1. Priority encoder 203 encodes the address of the first match, i.e., binary "0001101", thereby causing the retrieval of the next state binary "0010" from SRAM 204.

Figure 5:
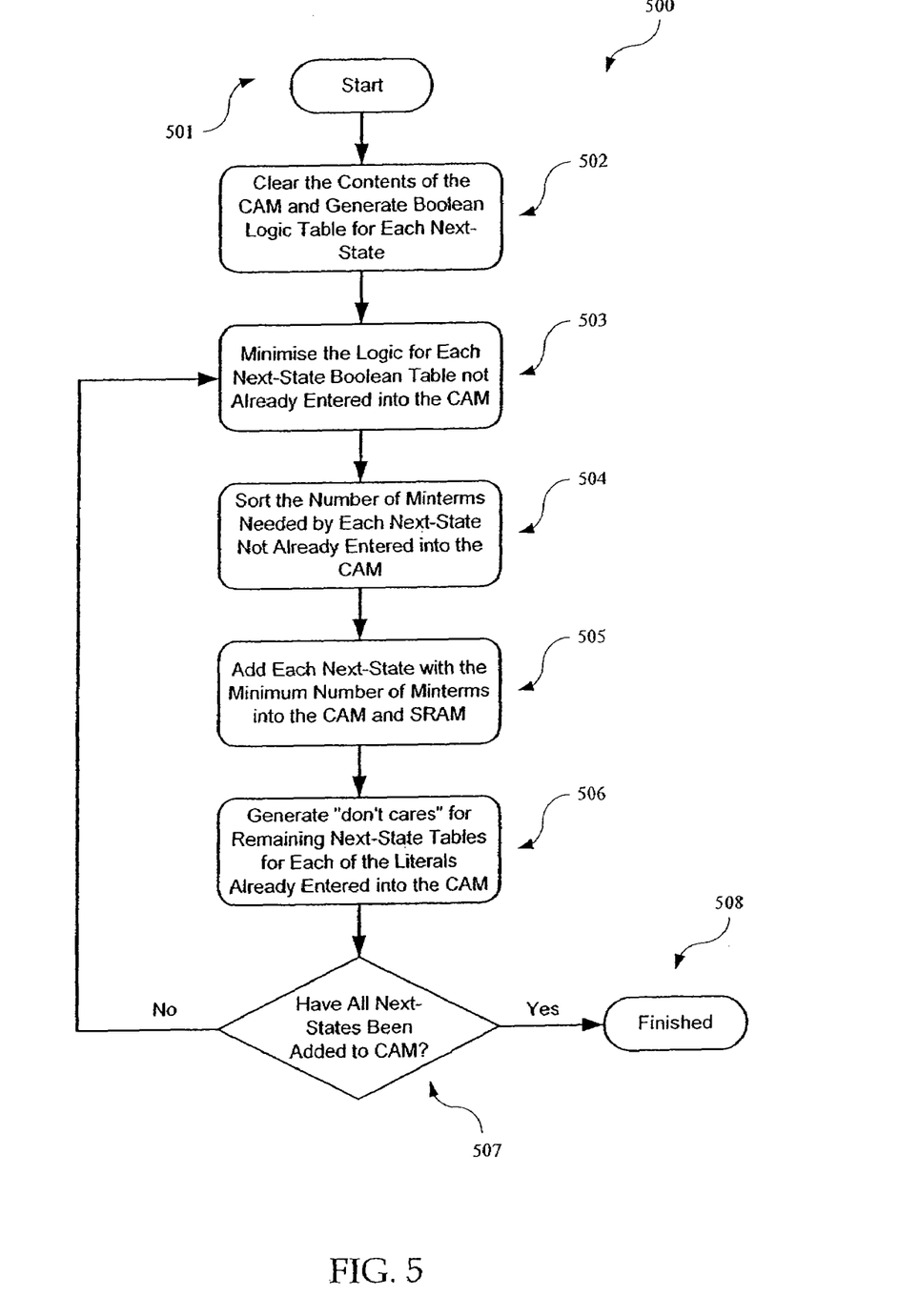
FIG. 5 is a flow chart of steps that may be used to minimize the storage requirements of the memories of the finite state machines of FIGS. 2-3, in accordance with one embodiment of the present invention.

In accordance with the present invention, the TCAM entries are computed such that they require relatively small storage capacity and are arranged such that the more specific rules are triggered before the more general ones (as already discussed). FIG. 5 is a flow chart of steps that may be used to minimize the memory usage, in accordance with one embodiment of the present invention. The flow chart is used to generate entries for both the TCAM and the RAM of the FSM.

The memory storage optimization starts in step 501. At step 502, the TCAM is cleared and a multitude of Boolean logic functions are generated for the states to which transition may be made. The clearing of the TCAM content may be done in hardware or software. A copy of the contents of the TCAM, i.e. memory image, may be maintained for purposes of the memory optimization algorithm. This memory image may be later uploaded to the hardware. One table for each state in the FSM is constructed. The table consists of $2^{m+k}$ rows, one for each state/symbol pair. A one (1) is placed in the row if the symbol corresponding to that row causes a transition from the state corresponding to that row, to the state for which the table is being constructed. Otherwise a zero (0) is placed in the row.

Next, at step 503 the generated Boolean logic tables are run through a standard logic minimization procedure, such as Espresso or Quine-McCluskey, as known to those skilled in the art. This produces a list of minterms for each "next-state". An example minimization method for producing the minterms by the Quine-McCluskey method is described in the attached Appendix A.

At step 504, the minterms are counted and the tables are sorted by number of minterms. The tables with the minimum number of minterms have their minterms added to the TCAM, and the corresponding state added to the SRAM, as shown in step 505. All remaining tables are modified by placing a "don't care" in the rows corresponding to the minterms added to the TCAM, as shown in step 506. The priority encoder is configured to select the upper entries in the TCAM first. The procedure is repeated until all states have been added to the TCAM, a shown in step 507. The memory storage optimization ends in step 508. In accordance with the algorithm described in connection with flow chart 500, the last entry in the ternary TCAM consists of all "don't cares". This implements an "else" clause that generates a default transition if no other rules have matched. Another way to implement the "else" clause is to leave the last entry out of the TCAM, and rely on the TCAM hardware to report a "no match" condition.

Figure 6A:
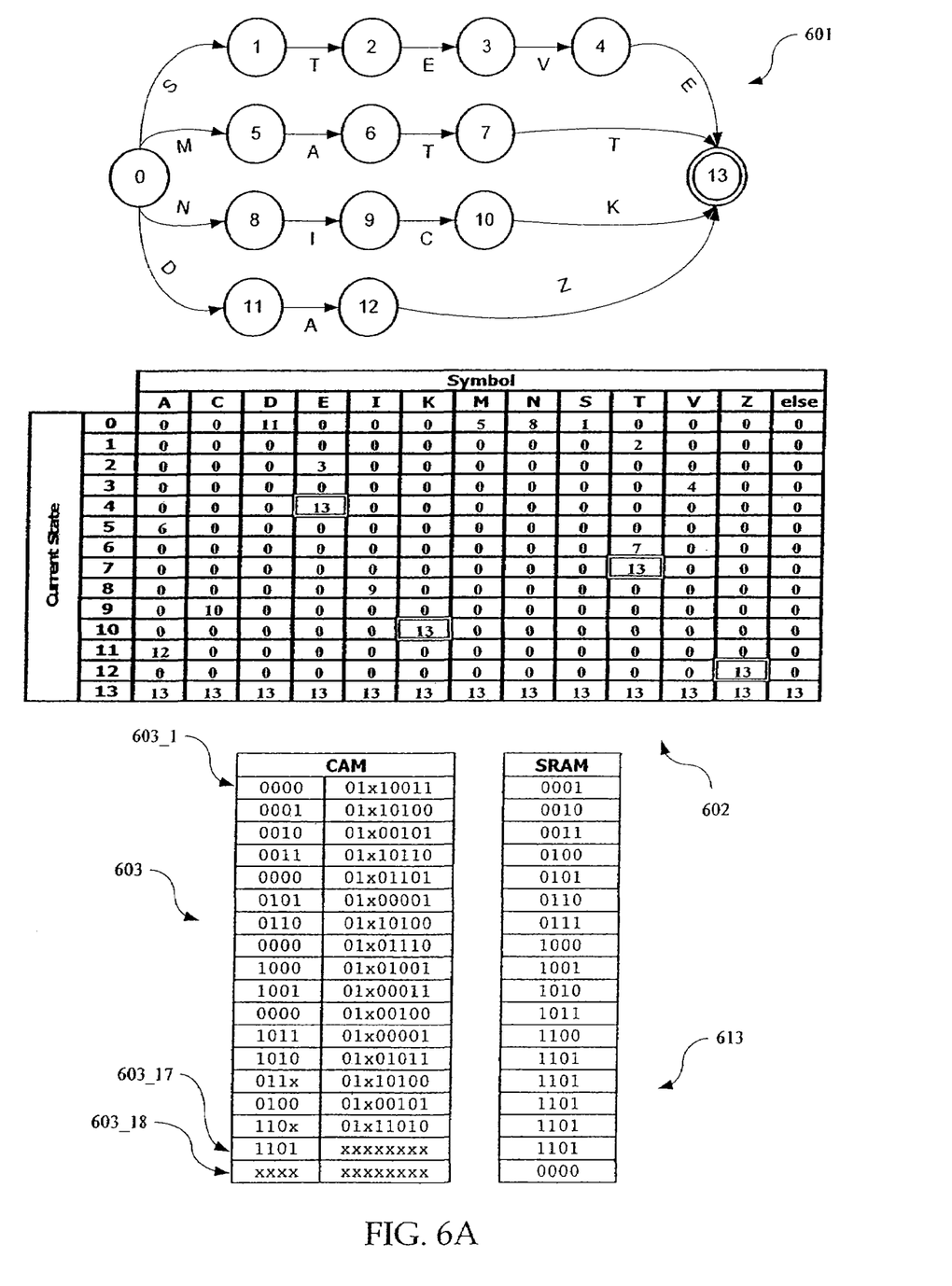
FIGS. 6A-6B show various tables associated with memory storage minimization method, in accordance with one exemplary embodiment of the present invention.
Figure 6B:
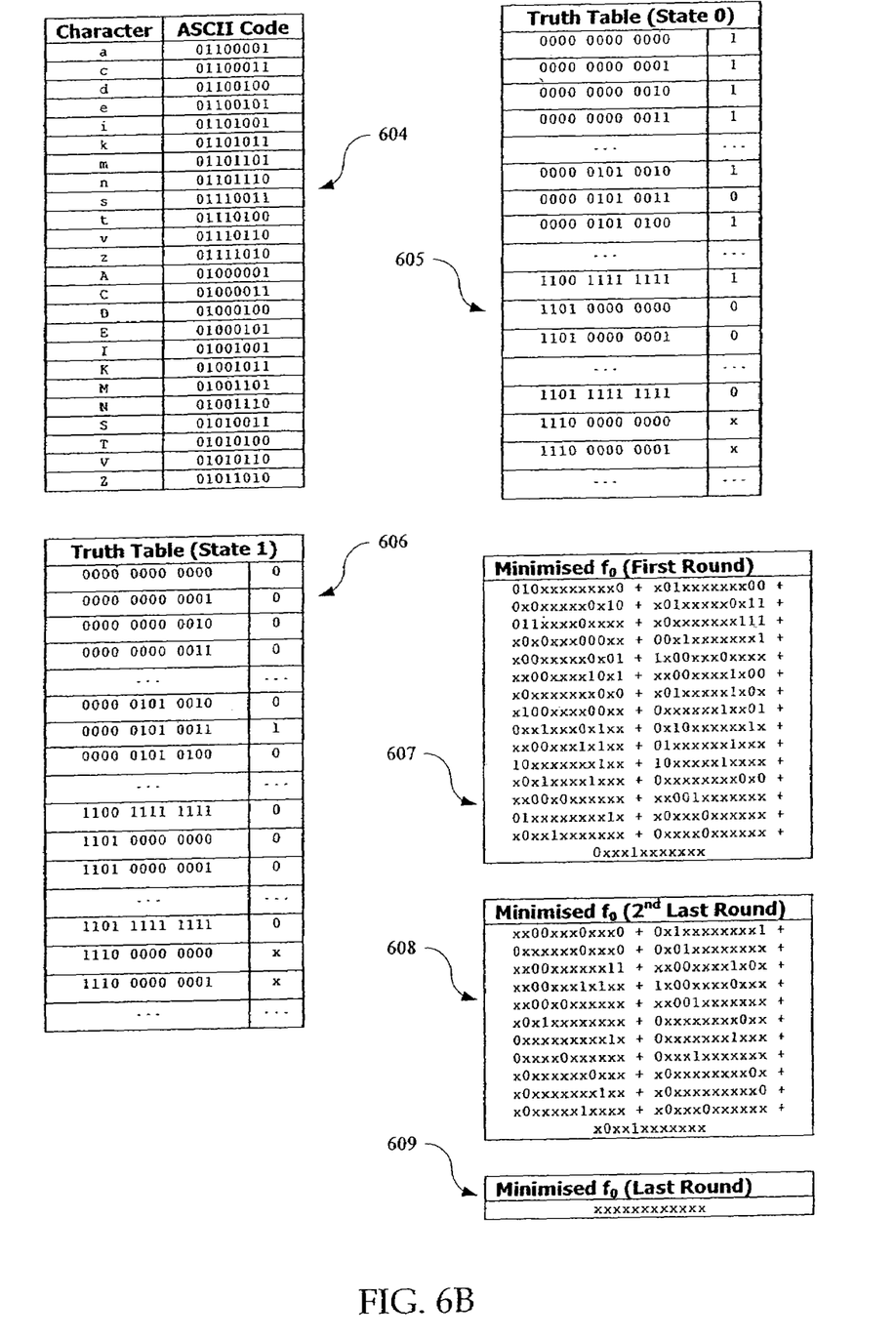

FIGS. 6A-6B show various exemplary tables associated with memory (e.g., TCAM 101 and SRAM 103 shown in FIG. 2) storage minimization method of an FSM, such as FSM 50, in accordance with one exemplary embodiment of the present invention. State transition diagram 601 of such an embodiment of FSM 50 is adapted to detect the words steve, matt, nick, or daz regardless of whether they appear in uppercase or lowercase. Transition table for this FSM is shown in table 602 in which the rows represent current state, and the columns represent input symbol. State 13 is a terminal accepting state, and after the FSM enters this state, it remains in this state. For simplicity and clarity, the transition diagram 601 does not show some of the transitions, such as transitions back to the state 0 (zero-th state), many of the transitions to states 1, 5, 8, and 11, and the transitions from state 13 back to state 13. As described further below, a conventional FSM may encode this transition table using 182 table entries, since there are 14 states and 13 symbols (including the "else" symbol). However, using the present invention, the FSM requires only 18 entries, i.e., 18 memory locations in the TCAM 101 and 18 memory locations in SRAM 103.

Each of TCAM 101 and SRAM 103 of FSM 50 associated with the example shown in FIGS. 6A-6B, require 18 entries. Table 603 shows the entries for TCAM 101, and table 613 shows the entries for SRAM 103. Using ASCII character encoding shown in table 604, the truth tables are formed for each "next-state" function. The truth tables for the first round of optimization for state 0 is shown in table 605, and the truth tables for the first round of optimization for state 1 is shown in table 606. Logic minimization on the truth table for state 1 results in one TCAM entry, shown as entry 603_1 in table 603. Logic minimization for state 0 results in 31 TCAM entries for the first round, and that is shown in table 607 in FIG. 6B. After all the transitions—except those associated with states 0 and 13—are added to the TCAM, the logic minimization procedure results in 23 TCAM entries associated with state 0, shown in table 608. After all the transitions associated with state 13 is added to the TCAM, shown as entry 603_17 in table 603, the minimization of transitions associated with state 0 results in a single TCAM entry, shown in table 609 and also shown as entry 603_18 in table 603, thereby resulting in the implementation of an "else" clause.

The following is a pseudo-code of memory optimization, in accordance with the present invention. The memory optimization procedure may be terminated early if all remaining minterms can fit into the available memory. In this case, the remaining minterms may simply be added to the TCAM and RAM as if they had been optimized.

```
Clear the TCAM and RAM memory images
Let F to be an empty set of boolean logic functions
For each state, S,
    Define the boolean logic function, f_S, for transitions to state
    Add f_S to the set of logic function F
Repeat
    For each boolean logic function in F
        Minimise the logic function f_S
        Count the number of minterms in f_S
    For the logic function, f_S', with the least minterms
        Remove f_S' from F
        For each minterm, M, in f_S'.
            Add M to the TCAM
            Add S' to the RAM
            For all f_S remaining in F
                Add "don't care" terms for M
Until all F is empty
```

As described above, the Boolean logic functions, $f_S$, are functions of the bit representations of both the current state and input symbol, that is, $f_S$ is a Boolean function taking m+k Boolean arguments, where m is the number of bits needed to represent the states, and k is the number of bits needed to represent the symbol. It is understood that state numbering is arbitrary, and renumbering of the states may affect the memory optimization process since each table entry is formed by concatenation of the state and symbol bits. Thus more compact representation of the state machine may be generated if a correlation exists between some of the states and symbols causing transitions to those states.

Figure 7:
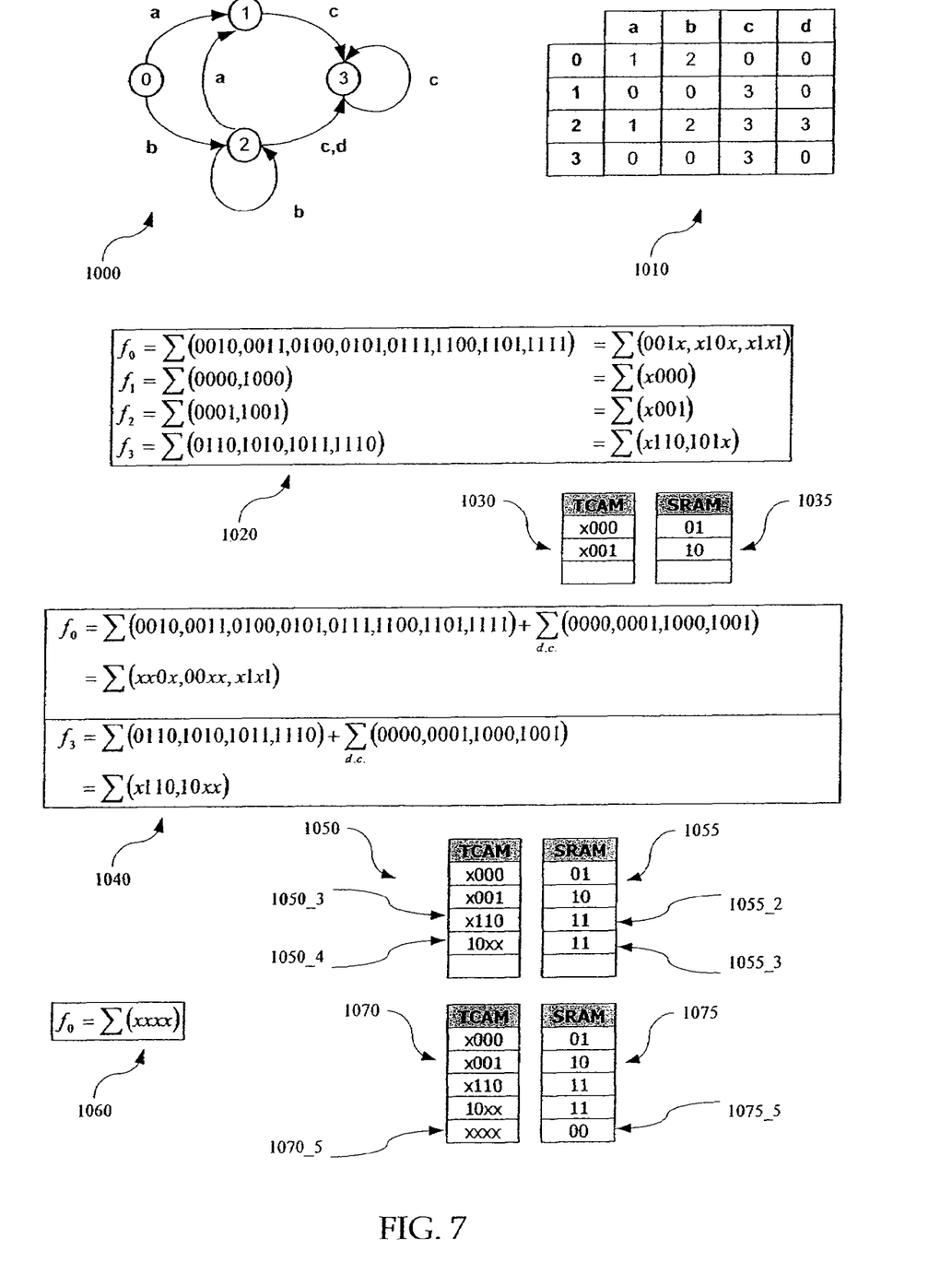
FIG. 7 shows various tables associated with the memory minimization process of an finite state machine, in accordance with another exemplary embodiment of the present invention.

FIG. 7 shows various tables associated with memory minimization process of an FSM, in accordance with another exemplary embodiment of the present invention. The state transition diagram 1000 of this FSM is described by the following regular expression:

$$b*(a|d)c*$$

Table 1010 shows the transition table of this FSM. These states may be encoded in binary as 00, 01, 10, and 11 for states 0, 1, 2, and 3 respectively. Likewise, symbols a, b, c, and d may be encoded as 00, 01, 10, and 11, respectively. First, the sum-of-product functions for each next-state is formed as is shown in table 1020. Next, each of these functions is minimized using a logic minimization algorithm such as the well-known Quine-McCluskey described in the attached Appendix A. Such logic minimization results in the function for state 0 being represented by three terms, namely terms 001x, x10x, x1x1, the function for state 1 being represented by one term, namely term x000, the function for state 1 being represented by one term, namely term x001, and the function for state 3 being represented by two terms, namely terms x110, and 101x.

Since each next-state function cannot be represented by less than one minterm, functions for states 1 and 2 are added to the TCAM at this point of optimization. The corresponding entries in the TCAM and RAM for these two states are shown in tables 1030, and 1035 respectively. The memory optimization algorithm continues with another round of logic minimization for the remaining two functions representing states 0 and 3, and where "don't cares" have been included for the entries already added to the TCAM. Table 1040 shows the result of this round of logic minimization.

Although in this simple example the number of minterms required by each function has not changed, the minterms at this stage of optimization are more general (i.e. there are more "don't cares" in the minterms). Because at this stage the terms representing state 3 have fewer terms than state 0, the terms for function representing state 3 are entered into the TCAM; these are shown as entries 1050_1, and 1055_2 in the associated TCAM table 1050. The corresponding entries 1050_3, and 1055_4 to the RAM are shown in table 1055. Since, at this stage only the function representing state 0 remains, this function is represented by all "don't care" bits, as shown in table 1060. This last function is added to the TCAM memory and is shown as entry 1070_5 in table 5. The corresponding entry in the SRAM is shown as entry 1075_5 in table 1075. Therefore, in accordance with the present invention, each of the TCAM and RAM require 5 entries. In contrast, a conventional FSM requires 16 entries in its RAM.

The following Table I shows the required memory storage for each of TCAM and SRAM of a conventional FSM vs. those required for an FSM in accordance with the present invention.

TABLE I

|  | TCAM Memory bits | SRAM Memory bits |
|---|---|---|
| Conventional | 0 | $2^{m+k}m$ |
| Present invention | $2^n(m + k)$ | $2^n m$ |

Because in typical signature databases, n is smaller than (m+k) typically, the memory compression described above, in accordance with the present invention, enables operation using smaller storage capacity than those known in the prior art. Thus, using the present invention, the hardware required to implement a given signature database is significantly reduced. It is understood that n must be at least as large as m, otherwise not all states can be represented.

As an example, a conventional state machine for signature-based security services, operating on a 1 Gbps network, using 8-bit symbols and requiring 20-bits for encoding the states, requires 5120 Mb of memory. However, for the same example, the state machine in accordance with the present invention may require as few as 112 Mb and 80 Mb of SRAM, thus the present invention offers a significant saving. The saving achieved would vary for each state machine, according to the operation of the invention.

Figure 8:
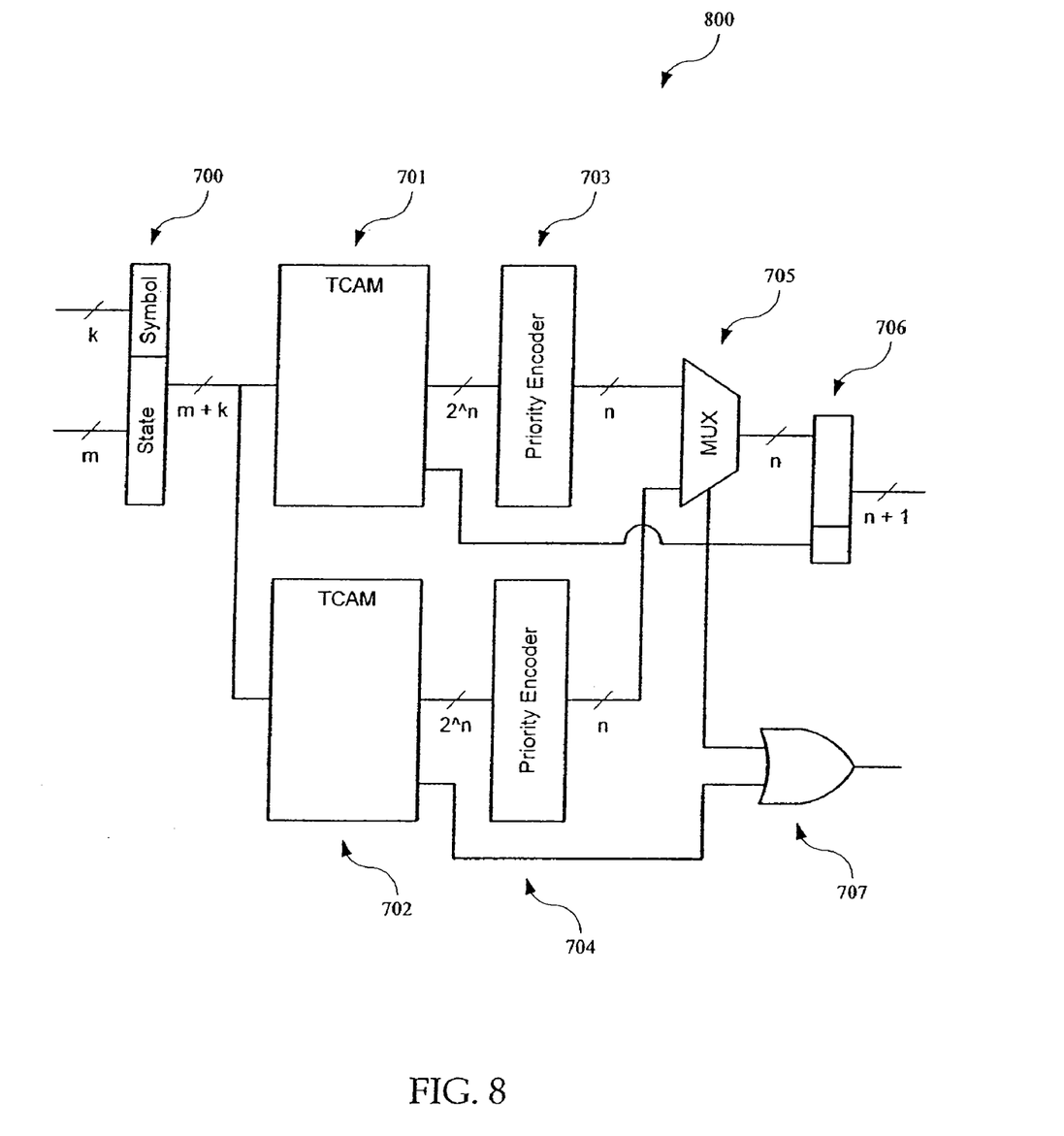
FIG. 8 is a simplified high-level block diagram of a programmable finite state machine having cascaded memories, in accordance with another embodiment of the present invention.

FIG. 8 is a simplified high-level block diagram of a programmable finite state machine 800 having cascaded TCAMs, in accordance with another embodiment of the present invention. TCAMs 701 and 702 are cascaded to form a finite state machine having a relatively deeper structure. This enables using several relatively smaller commercially available discrete TCAM chips. FSM 800 includes two TCAMs 701, and 702 and two priority encoders 703, 704. Each of TCAMs 701 and 702 is configured to receive the m+k word generated by register 700. Register 700 combines the m-bits of the present state, with the k-bits of the input symbol to generate this m+k word.

The n-bit outputs of the priority encoders 703 and 704 are supplied to a MUX 705. The MUX select line is connected to the "match" line of the first TCAM, [701]. Thus if a match is found in the first TCAM, the output of the MUX will be the address of this match, otherwise the output of the MUX will be the priority encoded output of TCAM 702. The output of the MUX and select line are concatenated by logic unit 706 to form an (n+1)-bit word shown in FIG. 8. A match signaled is asserted if either of the TCAMs generate a match. It is understood that more than any number of TCAMs may be cascaded to form a deep FSM, in accordance with the present invention.

Figure 9:
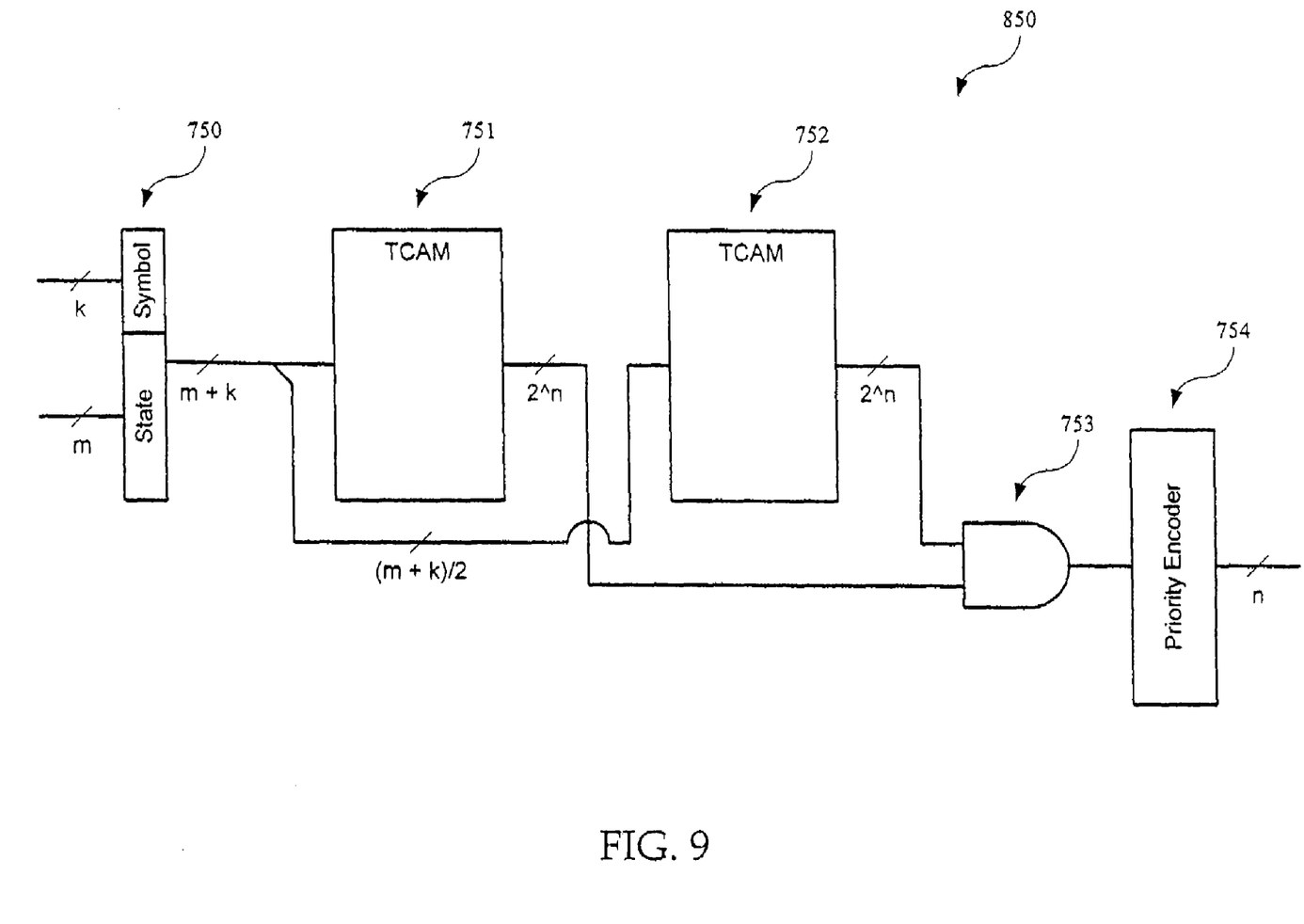
FIG. 9 is a simplified high-level block diagram of a programmable finite state machine having cascaded memories, in accordance with yet another embodiment of the present invention.

FIG. 9 is a simplified high-level block diagram of a programmable finite state machine 850 having cascaded TCAMs, in accordance with another embodiment of the present invention TCAMs 751 and 752 are cascaded to form a wider structures. This enables using several relatively smaller commercially available discrete TCAMs chips that have smaller word widths. As seen from FIG. 9, each of TCAMs 751 and 752 receives half of the (m+k)-bit word, where the current state is represented by m-bits and the current input symbol is represented by k bits. The outputs of the TCAMs are applied to AND gate 753. The output of AND gate 753 is, in turn, applied to priority encoder. It is understood that more than any number of TCAMs may be cascaded to form a wide FSM, in accordance with the present invention.

An FSM, in accordance with the present invention, may be used for, e.g., performing high-speed regular expression pattern matching on network data. Such a pattern matching is applicable in such areas as network intrusion detection, network monitoring and surveillance, virus protection, traffic filtering, content and copyright classification, storage area network indexing, policy and access control auditing, spam detection and prevention, fraud detection and network forensics, content-aware switching, message classification, etc.

The above embodiments of the present disclosure are illustrative and not limitative. The invention is neither limited by the size of the input symbol nor by the number of states to which the finite state machine may transition to. The invention is not limited by the type of memory used by the finite state machine. The invention is not limited by the type of algorithm used to minimize the number of minterms for each of the Boolean logic functions. Other additions, subtractions, deletions, and modifications may be made without departing from the scope of the present invention as set forth in the appended claims.

What is claimed is:

1. A programmable finite state machine configured to transition to one of a plurality of next states from a current state in response to receipt of an input symbol, each of the current state and next states being represented by m bits and each input symbol being represented by k bits, the programmable finite state machine comprising:
  a first memory configured to store a plurality of transition rules, said first memory further configured to receive a (k+m)-bit word representative of the input symbol and the current state and to supply one or more matching transition rules in response, wherein the one or more matching transition rules are stored in a ranking order of generality;
  a logic block configured to derive a specific transition rule from the one or more matching transition rules and the current state; and
  a second memory configured to receive the selected transition rule and to supply one of the plurality of next states in response.

2. The programmable finite state machine of claim 1 wherein the first memory is a ternary content addressable memory (TCAM).

3. The programmable finite state machine of claim 1 wherein the second memory is a static random access memory (SRAM).

4. The programmable finite state machine of claim 1 wherein the ranking order of generality is an increasing order of generality.

5. The programmable finite state machine of claim 1 wherein the ranking order of generality is a functionally derived order and which further dictates the configuration of the coupled logic block.

6. The programmable finite state machine of claim 1 wherein the ranking order of generality is an order derived to provide compatibility with the configuration of the coupled logic block.

7. The programmable finite state machine of claim 1 wherein the ranking order of generality is a decreasing order of generality.

8. The programmable finite state machine of claim 1 further comprising:
  a register configured to receive the k-bit input symbol and the m-bit current state and to generate the (k+m)-bit word supplied to the TCAM.

9. The programmable finite state machine of claim 1 further comprising:
  a look-up table configured to receive the m-bit next state from the second memory and to generate an associated output.

10. The programmable finite state machine of claim 9 wherein the LUT contains a bit configured to accept or reject a request.

11. The programmable finite state machine of claim 1 wherein the logic block is a priority encoder.

12. The programmable finite state machine of claim 1 wherein the logic block is a priority arbiter.

13. The programmable finite state machine of claim 2 further comprising: cascading a second TCAM to the first TCAM to increase a depth of the programmable finite state machine.

14. The programmable finite state machine of claim 2 further comprising: cascading a second TCAM to the first TCAM to increase a width of the programmable finite state machine.

15. The programmable finite state machine of claim 1 where the input symbol is received from a digital network, and the programmable finite state machine is configured to provide signature-based network security services selected from a group consisting of network intrusion detection, network monitoring and surveillance, virus protection, traffic filtering, content and copyright classification, storage area networks, policy and access control auditing, spam detection and prevention, fraud detection and network forensics, content-aware switching, and message classification.

16. A method for transitioning to one of a plurality of next states from a current state in response to receipt of an input symbol, each of the current and next states being represented by m bits and each input symbol being represented by k bits, method comprising:
  receiving a (k+m)-bit word representative of the k-bit input symbol and the m-bit current state;
  supplying one or more matching transition rules, wherein the one or more matching transition rules are stored in a ranking order of generality;
  deriving a specific transition rule from the one or more supplied matching transition rules and the current state; and
  supplying the one of the plurality of next states.

17. The method of claim 16 wherein the one or more matching transition rules is supplied by a ternary content addressable memory (TCAM).

18. The method of claim 16 wherein the one of the plurality of next states is supplied by a static random access memory (SRAM).

19. The method of claim 16 wherein the ranking order of generality is an increasing order of generality.

20. The method of claim 16 wherein the ranking order of generality is a functionally derived order and which further dictates the configuration of a coupled logic block.

21. The method of claim 16 wherein the ranking order of generality is an order derived to provide compatibility with the configuration of a coupled logic block.

22. The method of claim 16 wherein the ranking order of generality is a decreasing order of generality.

23. The method of claim 16 further comprising:
  storing the k-bit input symbol and the m-bit current state.

24. The method of claim 16 further comprising:
  generating an output for the one of the plurality of next states.

25. The method of claim 16 wherein most specific transition rule is selected by a priority encoder.

26. The method of claim 16 wherein most specific transition rule is selected by a priority arbiter.

27. The method of claim 17 further comprising cascading a second TCAM to the first TCAM to increase a depth of the plurality of next states.

28. The method of claim 17 further comprising cascading a second TCAM to the first TCAM to increase a width of the plurality of next states.

29. The method of claim 16 wherein transitioning to one of the plurality of next states from the current state is made in connection with a signature-based network security services selected from a group consisting of network intrusion detection, network monitoring and surveillance, virus protection, traffic filtering, content and copyright classification, storage area networks, policy and access control auditing, spam detection and prevention, fraud detection and network forensics, content-aware switching, and message classification.

* * * * *